United States Patent
Schenkel et al.

[19]

[11] Patent Number: 6,119,061
[45] Date of Patent: Sep. 12, 2000

[54] METHOD AND APPARATUS FOR CONTROLLING AN ELECTRO-HYDRAULIC DIFFERENTIAL STEERING SYSTEM

[75] Inventors: Nathan T. Schenkel, Brimfield; Stephen T. Tady, Lake in the Hills; Jeffrey M. Thate, Peoria; Arlyn P. Wilcox, Rockford, all of Ill.

[73] Assignee: Caterpillar Inc., Peoria, Ill.

[21] Appl. No.: 09/408,863

[22] Filed: Sep. 30, 1999

[51] Int. Cl.[7] .............................. B62D 11/00; B62D 11/10
[52] U.S. Cl. ................................ 701/42; 701/41; 180/6.64
[58] Field of Search .................................. 701/41, 42, 50; 180/6.64, 6.7, 8.7, 9.21, 9.44, 9.64, 411, 417; 172/278; 37/208, 237

[56] References Cited

U.S. PATENT DOCUMENTS

| | | | |
|---|---|---|---|
| 4,076,090 | 2/1978 | Krusche et al. | 180/6.48 |
| 4,161,865 | 7/1979 | Day | 60/385 |
| 4,315,555 | 2/1982 | Schritt | 180/140 |
| 5,099,138 | 3/1992 | Watanabe et al. | 180/140 |
| 5,101,919 | 4/1992 | Ossi | 180/6.2 |
| 5,208,751 | 5/1993 | Berkefeld | 364/424.05 |
| 5,249,639 | 10/1993 | Marr et al. | 180/133 |
| 5,487,437 | 1/1996 | Avitan | 180/6.5 |
| 5,489,005 | 2/1996 | Marcott et al. | 180/134 |
| 5,497,692 | 3/1996 | Marcott | 91/523 |
| 5,520,262 | 5/1996 | Marcott | 180/418 |
| 5,553,517 | 9/1996 | Yesel et al. | 74/731.1 |
| 5,590,041 | 12/1996 | Cooper | 364/424.051 |
| 5,787,374 | 7/1998 | Ferguson et al. | 701/41 |
| 5,805,449 | 9/1998 | Ito | 364/424.05 |
| 6,039,133 | 3/2000 | Zulu | 180/6.64 |

FOREIGN PATENT DOCUMENTS

0885798A1  12/1998  European Pat. Off. ........ B62D 11/18

OTHER PUBLICATIONS

Mistry and Hou, "Steering System of John Deer 8000 Series Track Tractors," FPST–vol. 5, Fluid Power Systems & Technology, ASME 1998, (month is not available).
Section 260 Steering and Brakes Operation Manual TM1622 (Sep. 22, 1997).

Primary Examiner—Tan Nguyen
Assistant Examiner—Dalena Tran
Attorney, Agent, or Firm—Clifton G. Green

[57] ABSTRACT

A device for controlling an electro-hydraulic differential steering system of a work machine. A first processing device receives a first signal indicative of a desired steering path, a second signal indicative of a ground speed, a third signal indicative of an engine speed, and a fourth signal indicative of a gage. The first processing device transmits a fifth signal as a function of the first, second, third, and fourth signals, the fifth signal being indicative of a desired pump displacement of the steering system. A second processing device receives a sixth signal indicative of a motor speed of the steering system, and the third signal. The second processing device transmits a seventh signal as a function of the third and sixth signals, the seventh signal being indicative of an actual pump displacement of the steering system. A proportional and integral controller is coupled with the first processing device to receive the fifth signal and coupled with the second processing device to receive the seventh signal.

15 Claims, 3 Drawing Sheets

METHOD AND APPARATUS FOR CONTROLLING AN ELECTRO-HYDRAULIC DIFFERENTIAL STEERING SYSTEM

TECHNICAL FIELD

The present invention relates generally to a control system, and more specifically, to a method and apparatus for controlling an electro-hydraulic differential steering system.

BACKGROUND ART

Many work machines use differential steering. Unlike conventional wheeled steering, which changes the orientation of the wheels, causing the machine to turn, differential steering increases the rotational speed of the ground engaging traction devices on one side of the machine relative to the other side, causing the machine to turn.

In the past, differential steering has been accomplished by mechanical and hydraulic means. The physical linkages and the sizing of the hydraulic pumps and motors contained within the differential steering system determined the steering characteristics of each machine. Once installed, the mechanical-hydraulic differential steering system maintained relatively simplistic and constant steering characteristics.

Electronic controllers are becoming increasingly popular, allowing for more complex control as compared to mechanical-hydraulic control, thereby allowing for more complex steering characteristics. A typical electronic differential steer system will include a steering wheel and steering wheel sensor that determines a position of the steering wheel, an engine and engine speed sensor, a machine speed sensor, and a gear position sensor. The sensors transmit data to the electronic controller, which controls the fluid flow from an over-center, closed-loop, variable displacement hydraulic pump. A hydraulic motor is coupled with the hydraulic pump to receive the fluid flow, and increases the rotational speed of one wheel or track on one side of the machine while decreasing the rotational speed of a second wheel or track on the other side of the machine. This difference in rotational speeds between the two sides of the machine causes the machine to turn.

In addition to the differential steering system, the machine typically includes a common drive system that provides a constant rotation to the wheels or tracks on both sides of the machine. Thus, the common mode drive system plus the differential steering system allows for complete directional movement and control of the machine.

FIG. 1 is a block diagram 10 of a conventional control scheme using closed loop control, with motor speed as a feedback term. In block 12, a steering wheel position, an engine speed, a ground speed of the machine (i.e., machine speed), and a gear position are all received. A nonlinear gain map transmits a desired motor speed signal as a function of the received information. Generally, the greater degree of turn will correspond to a higher desired motor speed. In block 14, the desired motor speed signal is summed with an actual motor speed feedback signal from block 16, discussed below, producing a motor speed error signal equal to the difference between the desired and actual motor speeds.

The motor speed error signal is input to a Proportional and Integral and Derivative (PID) controller in block 18 and processed by ways known to those skilled in the art, and transmits a scaled motor speed error signal. In block 20, the scaled motor speed error signal is processed by an electronic controller, and a pump command is transmitted as a function of the scaled motor speed error signal. In block 22, a steering pump receives the pump command, causing fluid flow as a function of the pump command. In block 24, a hydraulic steering motor receives the fluid flow, and produces a differential track speed by ways known to those skilled in the art as a function of the fluid flow. The steering motor speed is also fed back in block 16 to be summed in block 14.

This technique, however, has several heretofore-unrecognized disadvantages. First, if the feedback term from block 16 is lost, such as by a motor speed sensor failure, the technique described above will not function properly. In this instance (assuming no output from the motor speed feedback block 16), the motor speed error signal will equal the desired motor speed. When this motor speed error signal is input to the PID controller in block 18, the PID controller will amplify the motor speed error signal. Because the feedback term is zero, the motor speed error signal will be a positive value, indicating that the actual motor speed is less than the desired motor speed. The scaled motor speed error signal will cause the electronic PID controller to increase the fluid flow from the steering pump. Eventually, as the error signal continues to equal the desired motor speed signal, the output from the PID controller will saturate at its maximum, causing the pump to produce its maximum fluid flow, regardless of the steering wheel input and other inputs in block 12. In other words, this technique cannot run open-loop.

Second, this technique controls the error on the motor speed of the differential steering system, i.e., the input to the PID controller (block 18) is a motor speed. The device controlled by the controller (block 20), however, is the steering pump. Because the control action is based on the motor speed, while the controlled parameter is the displacement of the steering pump, open-loop control cannot be done directly, if at all.

DISCLOSURE OF THE INVENTION

The present invention provides apparatus and methods for controlling an electro-hydraulic differential steering system of a work machine. A first processing device receives a first signal indicative of a desired steering path, a second signal indicative of a ground speed, a third signal indicative of an engine speed, and a fourth signal indicative of a track gage. The first processing device transmits a fifth signal as a function of the first, second, third, and fourth signals, the fifth signal being indicative of a desired pump displacement of the steering system. A second processing device receives a sixth signal indicative of a motor speed of the steering system, and the third signal. The second processing device transmits a seventh signal as a function of the third and sixth signals, the seventh signal being indicative of an actual pump displacement of the steering system. A proportional and integral controller is coupled with the first processing device to receive the fifth signal and coupled with the second processing device to receive the seventh signal. The controller transmits an eighth signal as a function of the fifth and seventh signals, the eighth signal being indicative of an error between the actual pump displacement and the desired pump displacement. A third processing device is coupled with the first processing device to receive the fifth signal and with the controller to receive the eighth signal. The third processing device transmits a ninth signal as a function of the fifth and eighth signals, the ninth signal being indicative of a pump displacement command signal. A fourth processing device is coupled with the third processing device to receive the ninth signal. The fourth processing device transmits a tenth signal as a function of the ninth signal, the tenth signal operable to control a first valve of the steering system.

BEST MODE FOR CARRYING OUT THE INVENTION

Figure 1:
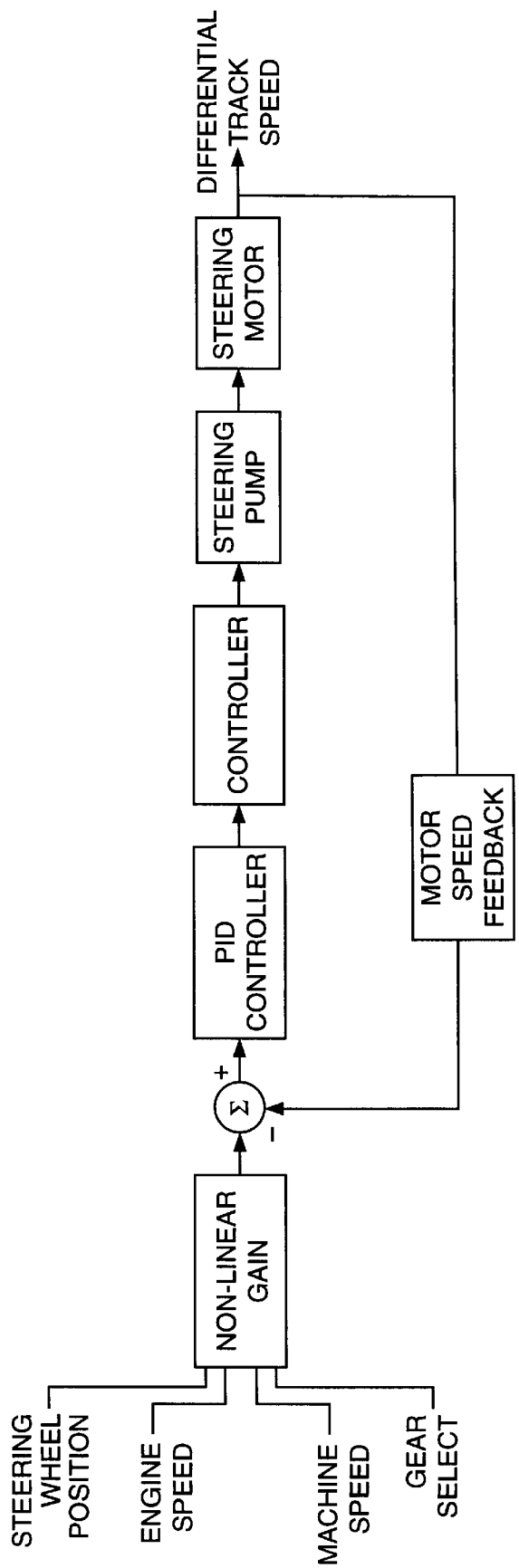
FIG. 1 is a block diagram of a prior art control scheme for an electro-hydraulic differential steering system.
Figure 2:
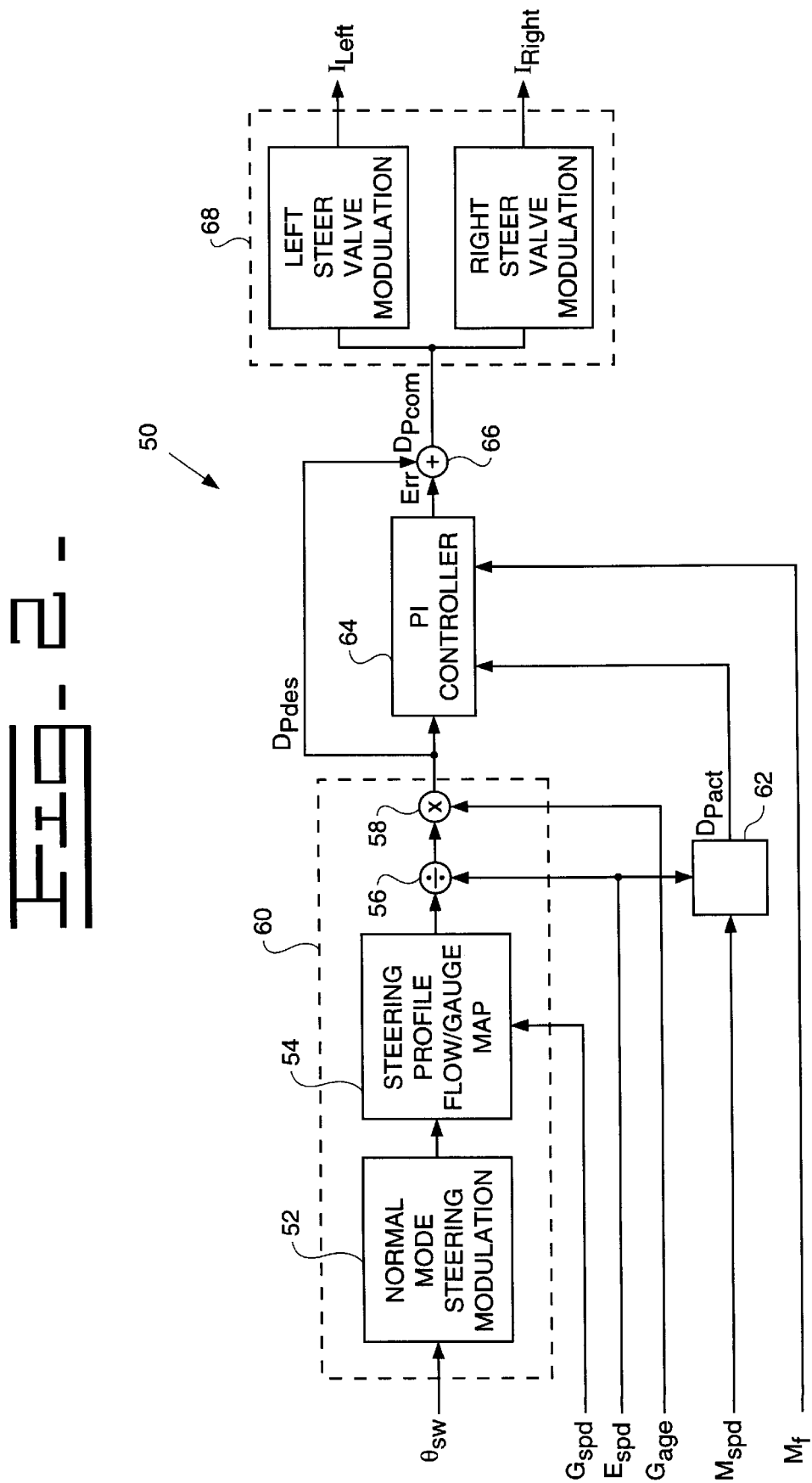
FIG. 2 is a block diagram for an electro-hydraulic differential steering system according to one embodiment of the invention.

FIG. 2 is a block diagram for an electro-hydraulic differential steering system controller 50 for use with a work machine according to one embodiment of the invention. A first signal indicative of a desired steering path, such as steering wheel position signal $\theta_{sw}$, is input to a first sub-processing section or sub-processor 52. The first sub-processor scales the steering wheel position signal according to a predetermined first map. Typically, the first map is a two-dimensional map, and provides for a linear output or an exponential output, depending on the desired steering characteristics. The first sub-processor 52 transmits a modulated first signal as a function of the steering wheel position signal $\theta_{sw}$. The first sub-processing section or processor 52 may be implemented in either hardware or software, or a combination thereof by ways known to those skilled in the art.

A second sub-processing section or sub-processor 54 is coupled with the first sub-processor to receive the modulated first signal. The second sub-processor 54 also receives a second signal $G_{spd}$ indicative of a ground speed of the work machine. The second sub-processor transmits a desired pump flow/gage signal as a function of the modulated first signal, the second signal, and a predetermined second map. Typically the second map is a three-dimensional map. The desired pump flow/gage signal is typically indicative of a pump flow/gage ratio for steering the work machine along the desired steering path. The second map may be tailored to provide a variety of steering characteristics, such as increasing the turn radius for a given desired steering path signal when the ground speed increases above a predetermined value, or maintaining a constant turn radius for a given desired steering path signal independent of engine speed. The second sub-processing section or processor 54 may be implemented in either hardware or software, or a combination thereof by ways known to those skilled in the art.

Although the first and second sub-processors 52, 54 and first and second maps could be combined into a signal sub-processing section or sub-processor with a single map, the calibration of a combined map would be relatively complex. Instead, by using two maps, the complexity of each map is reduced, allowing for easier calibration.

A third sub-processing section or sub-processor 56 receives a third signal indicative of an engine speed of the work machine, and divides the pump flow/gage ratio by the third signal. The third sub-processor 56 transmits a signal indicative of desired pump displacement/gage (pump flow/ engine speed correlates to pump displacement). The third sub-processing section or processor 56 may be implemented in either hardware or software, or a combination thereof by ways known to those skilled in the art.

A fourth sub-processing section or sub-processor 58 receives the signal indicative of desired pump displacement/ gage and a fourth signal GAGE indicative of a gage of the ground engaging traction devices, such as continuous belts (i.e., tracks) or wheels. The fourth sub-processor 58 multiplies the two received signals, and transmits a fifth signal $D_{Pdes}$ indicative of a desired pump displacement. The fourth sub-processing section or processor 58 may be implemented in either hardware or software, or a combination thereof by ways known to those skilled in the art.

The first through fourth sub-processors jointly make up a first processing section or processor 60. Although the sub-processors 52–58 are depicted as being in a particular order, their order may be changed as necessary. For example, the order of the third and fourth sub-processors 56, 58 may be switched due to the commutative properties of multiplication and division. Similarly, the first and second sub-processors 52, 54 may be placed in a different order, although some adjustment to the first and second maps may be required.

A second processing section or processor 62 receives a sixth signal indicative of an actual steering motor speed $M_{spd}$ of the differential steering system and the fourth signal. The second processor 62 transmits a seventh signal $D_{Pact}$ indicative of an actual steering pump displacement as a function of the received signals. Generally, steering motor speed divided by the engine speed correlates to a scaled pump displacement for a fixed displacement motor. The second processing section or processor 62 may be implemented in either hardware or software, or a combination thereof by ways known to those skilled in the art.

A Proportional and Integral (PI) section or controller 64 is coupled with the first and second processors to respectively receive the fifth and seventh signals. The PI controller 64 determines the difference (error) between the actual and desired pump displacement, and processes the error by any of a variety of ways known to those skilled in the art. The PI controller 64 transmits an eighth signal, such as an error signal Err, as a function of the fifth and seventh signals. The PI section or controller 64 may be implemented in either hardware or software, or a combination thereof by ways known to those skilled in the art.

The PI controller also receives a signal $M_f$ indicative of a motor speed sensor failure. When the PI controller receives the signal $M_f$, the PI controller shuts down its output, or outputs a zero.

A third processing section or processor 66 is coupled with the PI controller 64 to receive the eighth signal, and coupled with the first processor 60 to receive the fifth signal, i.e., the fifth signal is fed-forward. The third processor adds the fifth and eighth signals together, and transmits a ninth signal, such as a signal $D_{Pcom}$ indicative of a pump command signal, as a function of the fifth and ninth signals. The third processing section or processor 66 may be implemented in either hardware or software, or a combination thereof by ways known to those skilled in the art.

A fourth processing section or processor 68 is coupled with the third processor 66 to receive the ninth signal. The fourth processor 68 typically transmits a tenth and eleventh signals to a physical mechanism that controls the differential steering, such as a pilot valve (not shown) of a steering pump, as a function of the ninth signal. The pilot valve (not shown) typically controls a flow of fluid produced by the steering pump by ways known to those skilled in the art. For example, two solenoids act on respective sides of the pilot valve: one causing the pilot valve to shift in one direction, and the other causing the pilot valve to shift in the opposite direction. The pilot valve is typically spring-centered such that when neither solenoid is energized the pilot valve returns to center. Flow from the pump depends on the angle of the pump's swashplate. When the pilot valve is centered, the swashplate is over center and the pump produces no flow. When the pilot valve is shifted in one direction, e.g., by energizing one solenoid with the tenth signal, the pump produces flow in one direction. When the pilot valve is shifted in the opposite direction, e.g., by energizing the other solenoid with the eleventh signal, the pump produces flow in the opposite direction. Typically the tenth and eleventh signals are complementary, such that only one solenoid is energized at a time. The fourth processing section or processor 68 may be implemented in either hardware or software, or a combination thereof by ways known to those skilled in the art.

Significantly the electro-hydraulic differential steering system controller 50 can operate relatively normally under open-loop conditions. If the actual steering motor speed signal $M_{spd}$ is lost, such as by sensor failure, the PI controller 64 will shut down or output an error signal of zero as mentioned above. Thus, the pump command signal $D_{Pcom}$ will be strictly a function of the desired pump displacement $D_{Pdes}$, and the technique described herein may continue to be used to control the differential steering system.

Further, the electro-hydraulic differential steering system controller 50 controls the pump displacement, and the error signal transmitted by the PI controller 64 is a pump displacement. Thus, the input to the PI controller 64 is the parameter being controlled, allowing open-loop calibrations to be incorporated into the algorithm by means of two valve modulation maps within the fourth processor 68. The open-loop calibrations minimize the corrective action required by the PI controller 64.

Figure 3:
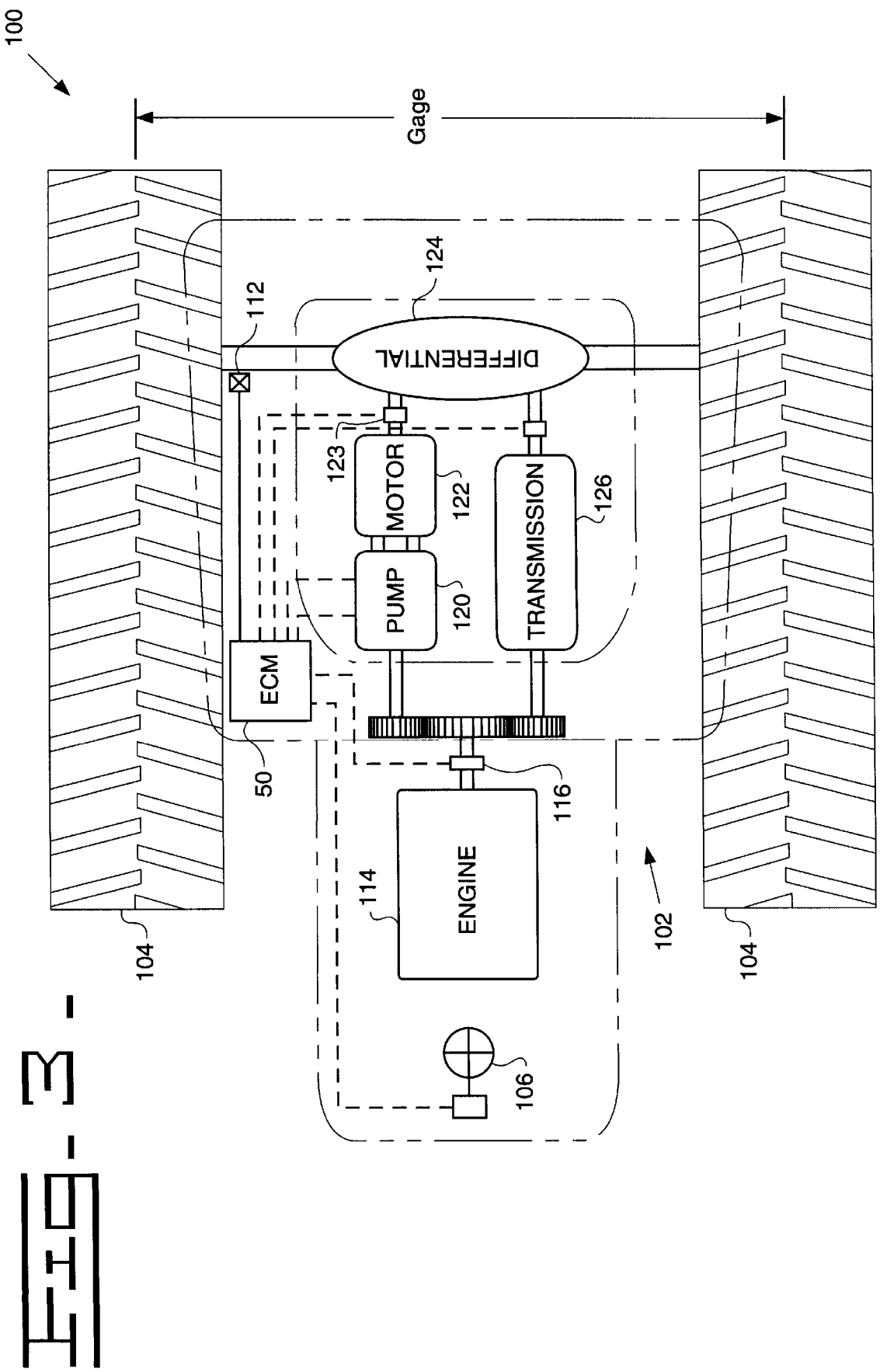
FIG. 3 is a top view and block diagram of a work machine according to one embodiment of the invention.

FIG. 3 is a top view and block diagram of a work machine 100 according to one embodiment of the invention. The work machine 100 includes a frame 102 and at least two ground engaging traction devices, such as continuous belts (e.g., tracks 104) or wheels coupled with the frame 102. A control input device, such as a steering wheel 106, is coupled with the frame 102 and transmits a desired steering path signal indicative of a desired steering path of the work machine 100 as a function of an operator input. A work machine velocity sensor 112, such as a transmission output speed sensor, or a ground speed radar or other device known to those skilled in the art, is coupled with the frame 102. The machine velocity sensor determines the approximate ground speed of the work machine 100 and transmits a ground speed signal indicative of the ground speed.

An engine 114, such as a compression ignition engine, is coupled with the frame 102 and produces a kinetic force by any of a variety of ways known to those skilled in the art. An engine speed sensor 116 is coupled with the engine 114 and transmits an engine speed signal indicative of an engine speed of the engine 114.

A gage signal generator, such as a memory device (not shown) integrated into the controller 50, having data indicative of a track gage of the machine, transmits a gage signal as a function of the gage of the tracks 104. The gage signal generator may be programmed with the appropriate gage, or the gage may be measured through appropriate sensors.

The electro-hydraulic differential steering system controller 50 is coupled with the frame 102 and receives the desired steering path signal, the ground speed signal, the engine speed signal, the gage signal, and a motor speed signal (discussed below). The controller 50 functions similarly to what is described above, and will not be repeated.

A hydraulic pump 120 is coupled with the controller 50 to receive the pump displacement command, and produces a fluid flow as a function of the pump displacement command and engine speed. The pump 120 is typically coupled with the engine 114 to receive at least a part of the kinetic force generated by the engine 114, and uses the kinetic force to create the fluid flow by ways known to those skilled in the art. Other mechanisms for generating fluid flow known to those skilled in the art may also be used.

A motor 122 is coupled with the hydraulic pump 120 to receive the fluid flow, and is coupled with at least two of the tracks 104. The motor 122 typically increases the rotational speed of one of the tracks 104 and decreases the rotational speed of the other of the tracks 104, typically via differential gearing known to those skilled in the art, as a function of the fluid flow. Alternately, the motor 122 may only increase or decrease the rotational speed of one of the tracks 104. The change in rotational speed effected by the motor 122 may be accomplished by a differential 124 or other appropriate ways known to those skilled in the art. A motor speed sensor 123 is coupled with the motor 122 to detect the motor speed, and transmits the motor speed signal $M_{spd}$ as a function of the motor speed.

The steering wheel 106, the engine 114, the pump 120, the motor 122, the differential 124, the tracks 104, and the sensors mentioned above typically make up a differential steering system.

The work machine 100 also typically includes a common drive system, such as a conventional transmission 126. The transmission 126 is coupled with the engine to receive at least a part of the kinetic energy, and rotates the two tracks 104 at equal velocities as a function of the received kinetic energy by ways known to those skilled in the art. The transmission 126 is typically coupled with the tracks 104 via the differential 124.

By creating a difference in the rotational velocities of the two tracks, the differential steering system causes the work machine 100 to turn. The greater the difference in velocities between the two tracks, the sharper the turn will be. The total velocity of each track 104 is the sum of the velocity from the transmission 126 (common drive) and the increase/decrease (differential steer) from the motor 122. From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for controlling an electro-hydraulic differential steering system of a work machine, comprising:

a first processing device operable to receive a first signal indicative of a desired steering path, a second signal indicative of a ground speed, a third signal indicative of an engine speed, and a fourth signal indicative of a gage, the first processing device operable to transmit a fifth signal as a function of the first, second, third, and fourth signals, the fifth signal being indicative of a desired pump displacement of the steering system;

a second processing device operable to receive a sixth signal indicative of a motor speed of the steering system, and to receive the third signal, the second processing device operable to transmit a seventh signal as a function of the third and sixth signals, the seventh signal being indicative of an actual pump displacement of the steering system;

a proportional and integral controller coupled with the first processing device to receive the fifth signal and coupled with the second processing device to receive the seventh signal, the controller operable to transmit an eighth signal as a function of the fifth and seventh signals, the eighth signal being indicative of an error between the actual pump displacement and the desired pump displacement;

a third processing device coupled with the first processing device to receive the fifth signal and with the controller to receive the eighth signal, the third processing device operable to transmit a ninth signal as a function of the fifth and eighth signals, the ninth signal being indicative of a pump displacement command signal; and a fourth processing device coupled with the third processing device to receive the ninth signal, the fourth processing device operable to transmit a tenth signal as a function of the ninth signal, the tenth signal operable to control a first portion of the steering system.

2. The apparatus of claim 1 wherein the first processing device comprises:

a first sub-processor operable to modulate the first signal as a function of a predetermined first map;

a second sub-processor operable to receive the modulated first signal from the first sub-processor, and to receive the second signal, the second sub-processor operable to transmit a desired pump flow/gage signal as a function of the modulated first signal, the second signal, and a predetermined second map;

a third sub-processor operable to receive the desired pump flow/gage signal and to respectively produce one of a pump desired pump displacement/gage signal and a pump flow signal as a function of the desired pump flow/gage signal and a respective one of an engine speed signal and a gage signal; and a fourth sub-processor coupled with the third sub-processor to receive the one of the respective pump displacement/gage signal and the pump flow signal and to produce the fifth signal as a function of the other of the pump displacement/gage signal and a pump flow signal.

3. The apparatus of claim 2 wherein the pump displacement/gage signal comprises the desired pump flow/gage signal divided by the third signal;

the pump flow signal comprises the desired pump flow/gage signal multiplied by the fourth signal; and the fifth signal comprises one of the pump displacement/gage signal multiplied by the fourth signal and the pump flow signal divided by the third signal.

4. The apparatus of claim 2 wherein the modulated first signal comprises a linear function of the first signal.

5. The apparatus of claim 2 wherein the modulated first signal comprises an exponential function of the first signal.

6. The apparatus of claim 2 wherein the first map is a two-dimensional map and the second map is a three-dimensional map.

7. The apparatus of claim 1 wherein the ninth signal comprises the sum of the fifth and eighth signals.

8. The apparatus of claim 1 wherein the fourth processing device is further operable to transmit an eleventh signal as a function of the ninth signal, the eleventh signal operable to control a second portion of the steering system.

9. The apparatus of claim 1 wherein the first portion of the steering system comprises a first solenoid of a pilot valve.

10. The apparatus of claim 8 wherein the second portion of the steering system comprises a second solenoid of a pilot valve.

11. A work machine, comprising:

a frame;

at least two ground engaging traction devices coupled with the frame;

a control input device coupled with the frame and operable to transmit a desired steering path signal as a function of an input;

a velocity sensor coupled with the frame, the velocity sensor operable to transmit a ground speed signal as a function of a ground speed of the work machine;

an engine coupled with the frame, the engine operable to produce a kinetic force;

an engine speed sensor coupled with the engine and operable to transmit an engine speed signal as a function of an engine speed;

a gage signal generator operable to transmit a gage signal as a function of the gage of the ground engaging traction devices;

an electronic controller comprising:

a first processing device coupled with the control input device to receive the steering path signal, with the velocity sensor to receive the ground speed signal, with the engine speed sensor to receive the engine speed signal, and with the gage signal generator to receive the gage signal, the first processing device operable to transmit a desired pump displacement signal as a function of the steering path signal, ground speed signal, engine speed signal, and gage signal;

a second processing device operable to receive a motor speed signal, and coupled with the engine speed sensor to receive the engine speed signal, the second processing device operable to transmit an actual pump displacement signal as a function of the engine speed signal and the motor speed signal;

a proportional and integral controller coupled with the first processing device to receive the desired pump displacement signal and coupled with the second processing device to receive the actual pump displacement signal, the controller operable to transmit an error signal as a function of the desired pump displacement signal and the actual pump displacement signal;

a third processing device coupled with the first processing device to receive the desired pump displacement signal and with the proportional and integral controller to receive the error signal, the third processing device operable to transmit a pump displacement command signal as a function of the desired pump displacement signal and the error signal; and a fourth processing device coupled with the third processing device to receive the pump displacement command signal, the fourth processing device operable to transmit a first pump control signal as a function of the first pump displacement command signal;

a hydraulic pump coupled with the fourth processing device to receive the first pump control signal, and operable to produce a fluid flow as a function of the first pump control signal;

a motor coupled with the hydraulic pump to receive the fluid flow and coupled with at least two of the ground engaging traction devices, the motor operable to increase the velocity of one of the ground engaging traction devices and to decrease the velocity of another of the ground engaging traction devices as a function of the fluid flow;

a motor speed sensor coupled with the motor and with the second processing device, the motor speed sensor operable to transmit a motor speed signal to the second processing device as a function of a motor speed of the motor; and a transmission coupled with the engine to receive the kinetic force, and coupled with two of the ground engaging traction devices, the transmission operable to rotate the two ground engaging traction devices at an equal velocity as a function of the kinetic force, the total velocity of each of the two ground engaging traction devices comprising the equal velocity from the transmission plus the differential velocity from the motor.

12. A method for controlling an electro-hydraulic differential steering system of a work machine, comprising:

receiving a first signal indicative of a desired steering path;

receiving a second signal indicative of a ground speed;

receiving a third signal indicative of an engine speed;

receiving a fourth signal indicative of a gage;

transmitting a fifth signal as a function of the first, the second, the third, and the fourth signals, the fifth signal being indicative of a desired pump displacement of the steering system;

receiving a sixth signal indicative of a motor speed of the steering system;

transmitting a seventh signal as a function of the sixth signal and the third signal, the seventh signal being indicative of an actual pump displacement of the steering system;

determining a ninth signal as a function of the difference between the fifth signal and the seventh signal, the ninth signal being an error signal including a proportional term and an integral term;

adding the fifth signal with the ninth signal;

transmitting a tenth signal as a function of the sum of the fifth and ninth signals, the tenth signal operable to control a first component of the steering system.

13. The method of claim 10 wherein transmitting the fifth signal comprises:

determining a first intermediate signal as a function of the first signal, the first intermediate signal being indicative of a scaled first signal;

determining a second intermediate signal as a function of the first intermediate signal and the second signal, the second intermediate signal being indicative of a desired pump flow/gage ratio;

dividing the second intermediate signal by the third signal and multiplying by the fourth signal; and transmitting the second intermediate signal divided by the third signal and multiplied by the fourth signal, the transmitted signal being indicative of a desired pump displacement of the steering system.

14. The method of claim 10, further comprising transmitting an eleventh signal as a function of the sum of the fifth and the ninth signals, the eleventh signal operable to control a second component of the steering system, the eleventh signal being complementary to the tenth signal.

15. The method of claim 10 wherein the first component comprises a pilot valve on a hydraulic pump.

* * * * *